3,573,921
SILVER HALIDE EMULSIONS CONTAINING POLY-NUCLEAR UNDISSOCIATED CYANINE DYES

Philip W. Jenkins and Leslie G. S. Brooker, Rochester, N.Y., assignors to Eastman Kodak Company, Rochester, N.Y.
No Drawing. Filed July 28, 1967, Ser. No. 656,648
Int. Cl. G03c 1/10
U.S. Cl. 96—105      10 Claims

ABSTRACT OF THE DISCLOSURE

Novel polynuclear cyanine dyes are prepared from certain 3,5-pyrazolidinedione compounds. The cyanine dyes obtained extend the sensitivity of photographic silver halide emulsions into the red and infrared regions of the spectrum. 5-<{2,5-bis[3,3-dimethyl-1-(4-sulfobutyl)-2 - indolinylidene]ethylidene}cyclopentylidene>-1,2 - diphenyl-3,5-pyrazolidinedione ditriethylammonium salt is an example of the new dye compounds.

---

This invention relates to novel photographic materials, and more particularly to a new class of polynuclear undissociated cyanine dyes derived from 3,5-pyrazolidinediones, to photographic silver halide emulsions sensitized with these and photographic elements therewith, and to means for preparing such dyes and photographic materials.

It is known that cyanine dyes extend the sensitivity of photographic silver halide emulsions. However, this class is known to include whole groups of dyes which have no sensitizing properties or which even have a desensitizing effect. The number of sensitizers that can be used in practice is further limited by their inability to meet the strict requirements of having selective sensitivity, being substantially free from undesirable fogging properties, and causing no marked deterioration of the keeping over periods of time such as handling and storage pending actual use of the photographic materials containing such sensitizers. These requirements are even more stringent where the sensitizing dyes are intended for color photographic materials and processes. For these and other reasons, new spectral sensitizing dyes are desired.

We have now found that certain polynuclear undissociated cyanine dyes derived from certain 3,5-pyrazolidinediones satisfactorily comply with the above mentioned requirements of desirable selectivity, substantial freedom from fogging effects and good stability, as well as meeting other quality conditions of the photographic art, and thus provide a new class of particularly useful sensitizers for both black-and-white and color photographic materials. They are especially useful for infrared photographic applications having the ability to sensitize photographic silver halide emulsions over a wavelength range of about from 750 to 900 m$\mu$, with maximum sensitivity ranging about from about 800 to 875 m$\mu$. A number of the new dyes of the invention have also been found to be useful as diagnostic tools in medicine.

It is, therefore, an object of the invention to provide a new class of polynuclear undissociated cyanine dyes containing a 3,5-pyrazolidinedione nucleus in the polymethine chain that function as spectral sensitizers for photographic silver halide emulsions in the red to infrared regions of the spectrum.

Another object is to provide novel photographic silver halide emulsions containing therein one or more of the new cyanine dyes of the invention, and novel photographic elements prepared therewith.

A further object is to provide means for preparing the new class of dyes and novel photographic materials of the invention.

Other objects will become evident from a consideration of the general description and the appended claims.

The new class of polynuclear undissociated cyanine dyes of the invention are represented by the following general formula:

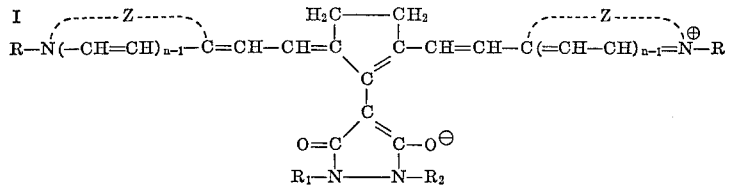

wherein each $n$ represents the same positive integer of from 1 to 2, each R represents the same member selected from the group consisting of an alkyl group, preferably a lower alkyl containing from 1 to 4 carbon atoms, e.g., methyl, ethyl, propyl, isopropyl, butyl, hexyl, octyl, decyl, dodecyl, etc., or a substituted alkyl group, preferably a substituted lower alkyl containing from 1 to 4 carbon atoms, such as a hydroxyalkyl group, e.g., $\beta$-hydroxyethyl, $\omega$-hydroxybutyl, etc., an alkoxyalkyl group, e.g., $\beta$-methoxyethyl, $\omega$-butoxybutyl, etc., a carboxyalkyl group, e.g., $\beta$-carboxyethyl, $\omega$-carboxybutyl, etc., a sulfoalkyl group, e.g., $\beta$-sulfoethyl, $\omega$-sulfobutyl, etc., a sulfatoalkyl group, e.g., $\beta$-sulfatoethyl, $\omega$-sulfatobutyl, etc., an acyloxyalkyl group, e.g., $\beta$-acetoxyethyl, $\gamma$-propionyloxypropyl, $\omega$-butyryloxybutyl etc., and an alkoxycarbonylalkyl group, e.g., $\beta$-methoxycarbonylethyl, $\omega$-methoxycarbonylbutyl, etc., or an allyl group, or an aralkyl group, e.g., benzyl, phenethyl, etc., or an aryl group, e.g., phenyl, tolyl, xylyl, chlorophenyl, sulfophenyl, carboxyphenyl, etc., $R_1$ and $R_2$ each represents the same or different member selected from the group consisting of an alkyl group, preferably a lower alkyl containing from 1 to 4 carbon atoms, e.g., methyl, ethyl, propyl, isopropyl, butyl, hexyl, decyl, dodecyl, etc., or an alkoxycarbonyl group, e.g., methoxycarbonyl, ethoxycarbonyl, propoxycarbonyl, isopropoxycarbonyl, butoxycarbonyl, etc., an aryloxycarbonyl group, e.g., phenoxycarbonyl, 4-methylphenoxycarbonyl, $\gamma$- or $\beta$-naphthoxycarbonyl, etc., or an aryl group, e.g., phenyl, tolyl, xylyl, methoxyphenyl, chlorophenyl, etc., and each Z represents the same nonmetallic atoms necessary to complete the same 5- to 6-membered heterocyclic nucleus selected from the group consisting of a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), a benzothiazole nucleus (e.g., benzothiazole, 4-chlorobenzothiazole, 5-chlorobenzothiazole, 6 - chlorobenzothiazole, 7 - chlorobenzothiazole, 4-methylbenzothiazole, 5-methylbenzothiazole, 6-methylbenzothiazole, 5-bromobenzothiazole, 6-bromobenzothiazole, 4 - phenylbenzothiazole, 5 - phenylbenzothiazole, 4 - methoxybenzothiazole, 5 - methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5 - hydroxybenzothiazole, 6-hydroxybenzothiazole, etc.), a naphthothiazole nucleus, (e.g., α-naphthothiazole, β-naphthothiazole, 5-methyoxy-β,β-naphthothiazole, 5-ethoxy - β - naphthothiazole, 8-methoxy-α-naphthothiazole, 7 - methoxy-α-naphthothiazole, etc.), a thionaphtheno-7',6',4,5-thiazole nucleus (e.g., 4'-methoxythianaphtheno-7',6',4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-chlorobenzoxazole, 5-methylbenzoxazole, 5 - phenylbenzoxazole, 6 - methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), a naphthoxazole nucleus (e.g., α-naphthoxazole, β-naphthoxazole, etc.), a selenazole nucleus (e.g., 4-methylselenazole, 4-phenylsenenazole, etc.), a benzoselenazole nucleus (e.g., benzoselenazole, 5 - chlorobenzoselenazole, 5 - methoxybenzoselenazole, 5-hydroxybenzoselenazole, tetrahydrobenzoselenazole, etc.), a naphthoselenazole nucleus (e.g., α-naphthoselenazole, β-naphthoselenazole, etc.), a thiazoline nucleus (e.g., thiazoline, 4-methylthiazoline, etc.), a 2-pyridine nucleus (e.g., 2-pyridine, 5-methyl-2-pyridine, etc.), a 4-pyridine nucleus (e.g., 4-pyridine, 3-methyl-4-pyridine, etc.), a 2-quinoline nucleus (e.g., 2-quinoline, 3-methyl - 2 - quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, etc.), a 4-quinoline nucleus (e.g., 4-quinoline, 6-methoxy-4-quinoline, 7-methyl-4-quinoline, 8-chloro-4-quinoline, etc.), a 1-isoquinoline nucleus (e.g., 1-isoquinoline, 3,4-dihydro-1-isoquinoline, etc.), a 3-isoquinoline nucleus (e.g., 3-isoquinoline, etc.), a 3,3-dialkylindolenine nucleus (e.g., 3,3-dimethylindolenine, 3,3,5-trimethylindolenine, 3,3,7-trimethylindolenine, etc.), an imidazole nucleus (e.g., imidazole, 1-alkylimidazole, 1-alkyl-4-phenylimidazole, 1-alkyl-4,5-dimethylimidazole, etc.), a benzimidazole nucleus (e.g., benzimidazole, 1-alkylbenzimidazole, 1-aryl-5,6 - dichlorobenzimidazole, etc.), a naphthimidazole nucleus (e.g., 1-alkyl-α-naphthimidazole, 1-aryl-β-naphthimidazole, 1-alkyl-5-methoxy-α-naphthimidazole, etc.), It will be understood that the above general formula includes the ammonium, substituted ammonium, and alkali metal salts such as sodium, potassium, etc., when R represents a carboxyalkyl, a sulfoalkyl or a sulfatoalkyl group.

The new polynuclear undissociated cyanine dyes of the invention are conveniently prepared by condensing (1) a nitrogen heterocyclic of the general formula:

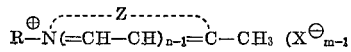

wherein $n$, R and Z are as previously defined, X represents an acid anion, e.g., chloride, bromide, iodide, thiocyanate, sulfamate, perchlorate, p-toluenesulfonate, methyl sulfate, ethyl sulfate, etc., and $m$ represents a positive integer of from 1 to 2 such that when $m$ is 1, the symbol R stands for a carboxyalkyl, a sulfoalkyl or a sulfatoalkyl radical, with (2) an appropriate 3,5-pyrazolidenedione derivative selected from those having the general formula:

III 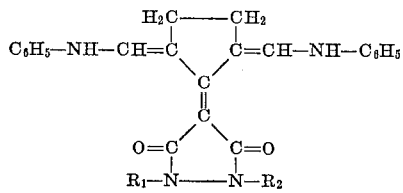

wherein $R_1$ and $R_2$ are as previously defined. Advantageously, the condensation reactions are carried out in an inert solvent medium such as N,N-dimethylacetamide, at elevated temperatures, for example, at about 120–150 degrees C., in the presence of a basic condensing agent such as a trialkylamine, e.g., triethylamine, tripropylamine, triisopropylamine, etc., N,N-dialkylanilinnes such as N,N-dimethylaniline, etc., N-alkylpiperidines such as N-methylpiperidine, etc., and the like. After cooling the reaction mixture, a diluent such as ether is added and the mixtures then chilled, followed by separation of the thus formed semicrystalline solids by decantation of the supernatant liquid, by filtration, or both. The crude dye products are then purified by boiling with acetone, and dried under vacuum. Further purification is carried out by one or more recrystallizations from absolute ethanol and washing with acetone. When R is a carboxyalkyl, a sulfoalkyl or a sulfatoalkyl, the dyes prepared as above are obtained in the form of their salts, and can be used in this form directly as sensitizers in photographic silver halide emulsions.

The following examples further illustrate the novel cyanine dyes and photographic materials of the invention.

EXAMPLE 1

5-<{2,5-bis[3,3-dimethyl-1-(4-sulfobutyl - 2 - indolinylidene]ethylidene}cyclopentylidene> - 1,2 - diphenyl-3,5-pyrazolidinedione ditriethylammonium salt

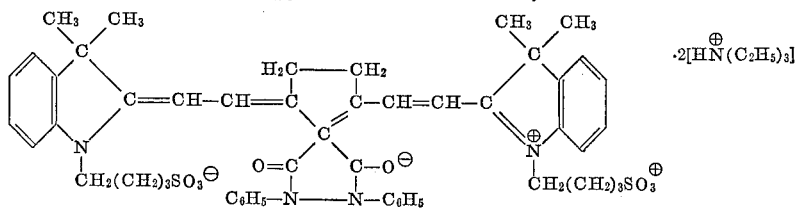

2,3,3-trimethylindole (8.85 g., 1 mol.+100% and 1,4-butanesultone (8.35 g., 1 mol.+120%) were mixed and heated at 135 degrees C. in an oil bath for six hours. The mixture was cooled and the resulting glass was broken up to a powder under ether. The ether was removed and this crude product was mixed with 4-(2,5-dianilinomethylenecyclopentylidene) - 1,2 - diphenyl-3,5-pyrazolidinedione, (7.30 g., 1 mol.), triethylamine (6.80 g., 1 mol.+45), and N,N-dimethylacetamide (50 ml.), and the mixture was heated with stirring at 130–147 degrees C. for eight minutes. The mixture was cooled, transferred to a beaker, and diluted with ether (1.5 l.). After chilling the mixture overnight, the ether was decanted and the residual semicrystalline solid was dried under vacuum. The crude product was then boiled with dry acetone (500 ml.). The mixture was chilled, and the crude dye was collected by filtration, washed with dry acetone, and dried under vacuum. After one recrystallization carried out by dissolving the dye in absolute ethanol (50 ml.) and reprecipitating by the addition of dry acetone (1 l.) containing triethylamine (3 ml.), the yield of pure dye was 5.43 g. (34%), M.P. 182.0–185.0 degrees C. dec.

EXAMPLE 2

5<{2,5-bis[1,1-dimethyl - 3 - (4-sulfobutyl)benz[e]indolin - 2 - ylidene]ethylidene}cyclopentylidene>-1,2 - diphenyl-3,5-pyrazolidinedione ditriethylammonium salt

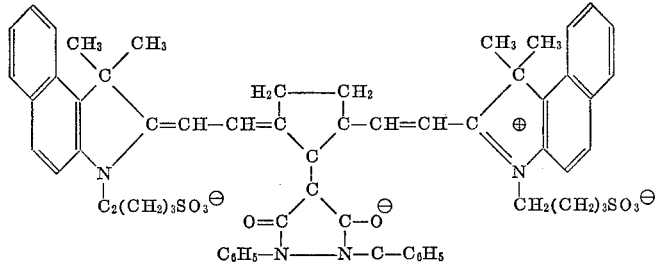 

Anhydro - 3 - (4 - sulfobutyl)-1,1,2-trimethylbenz[e] indolium hydroxide (20.70 g., 1 mol+50%), 4-(2,5-dianilinomethylenecyclopentylidene) - 1,2 - diphenyl - 3,5-pyrazolidinedione (10.50 g., 1 mol.), triethylamine (6.05 g., 1 mol+50%), and N,N-dimethylacetamide (85 ml.) were mixed and heated with stirring at 130–141 degrees C. for eight minutes. The mixture was transferred to a beaker, cooled and diluted with ether (1.5 l.). After chilling, the ether was decanted and the residual semicrystalline solid was dried briefly under vacuum. The crude product was then boiled with dry acetone (500 ml.). The mixture was chilled, and the product was collected by filtration, washed with dry acetone, and dried under vacuum. After one recrystallization from absolute ethanol and dry acetone containing triethylamine, followed by one recrystallization from absolute ethanol and dry acetone alone, the yield of pure dye was 19.93 g. (81%), M.P. 226.5–229.5 degrees C. dec.

*Analysis.*—Calcd. for $C_{72}H_{90}N_6O_8S_2$ (percent): C, 70.2; H, 7.4. Found (percent): C,69.9; H, 7.4.

By substituting different intermediates defined by Formula II in place of those specified in the preceding examples, other polynuclear cyanine dyes of the invention can be readily prepared in accordance with the procedures of these examples. Thus, intermediates, wherein Z represents the non-metallic atoms necessary to complete, for example, a thiazole, a benzothiazole, a naphthothiazole, an oxazole, a benzoxazole, a naphthoxazole, a selenazole, a benzoselenazole, a naphthoselenazole, a thiazoline, a 2- or 4-quinoline, a 1- or 3-isoquinoline, a 2- or 4-pyridine, an imidazole, a benzimidazole, or a naphthimidazole nucleus can be substituted in the procedures of the above examples to give the corresponding polynuclear cyanine dyes having generally similar sensitizing properties when incorporated in photographic silver halide emulsions. For example, intermediates such as 3-ethyl (or methyl, propyl, isopropyl, butyl, etc.) benzothiazolium salts (e.g., chloride, bromide, iodide, perchlorate, p-toluenesulfonate, etc.), 3-ethylbenzoxazolium salts, 3-ethylbenzoselenazolium salts, 3-ethylbenzimidazolium salts, 3-ethylthiazolium salts, 3-ethyl-β-naphthothiazolium salts, etc., give the dye 5<{2,5 - bis[3-ethylbenzothiazolinylidene]ethylidene}cyclopentylidene> - 1,2 - diethyl-3,5-pyrazolidenedione, the dye 5<{2,5 - bis[3 - ethylbenzoxazolinylidene]ethylidene}cyclopentylidene>1,2-diphenyl - 3,5 - pyrazolidinedione, the dye 5<{2,5-bis[3-ethylbenzoselenazolinylidene]ethylidene}cyclopentylidene>1,2-diethyl - 3,5-pyrazolidenedione, the dye 5<{2,5-bis[3 - ethylbenzimidazolinylidene]ethylidene}cyclopentylidene>-1,2 - diphenyl-3,5-pyrazolidenedione, the dye 5<2,5-bis[3-ethylthiazolinylidene[ethyiene}cyclopentylidene>1,2 - diethyl-3,5-pyrazolidenedione, the dye 5<{3-ethyl-β-naphthothiazolinylidene]ethylidene}cyclopentylidene>1,2 - diphenyl-3,5-pyrazolidinedione, respectively, and the like. It will be apparent from the foregoing that any of the 3,5-pyrazolidinedione intermediates defined by Formula III above can be condensed with any of the above mentioned Formula II intermediates to give still other corresponding polynuclear sensitizing dyes of the invention.

The following examples illustrate the preparation of the 3,5-pyrazolinedione intermediates employed to prepare the cyanine dyes of the invention in the above described procedures.

EXAMPLE 3

4-cyclopentylidene-1,2-diphenyl-3,5-pyrazolidinedione

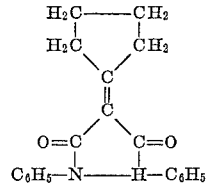

1,2-diphenyl-3,5-pyrazolidinedione (25.2 g., 1 mol.), cyclopentanone (8.5 g., 1 mol.), ammonium acetate (1.0 g.), glacial acetic acid (1.6 ml.), and chloroform (200 ml.) were placed in a 300 ml. flask to which a soxhlet extractor was attached, the cup of which contained anhydrous magnesium sulfate (24 g.) [Linde type 3A molecular sieves (40 g.) may also be employed in place of the magnesium sulfate]. The mixture was heated under reflux for twenty hours. The mixture was concentrated to dryness under reduced pressure and the residual oil which spontaneously crystallized was recrystallized from absolute ethanol (250 ml.). After one additional recrystallization from absolute ethanol, the yield of pure product was 23.15 g. (73%), M.P. 153.0–155.0 degrees C.

EXAMPLE 4

4-(2,5-dianilinomethylenecyclopentylidene)-1,2-diphenyl-3,5-pyrazolidinedione

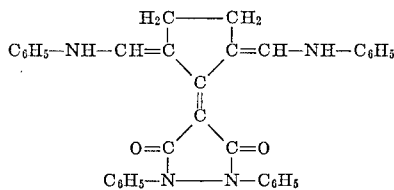

4-cyclopentylidene - 1,2 - diphenyl-3,5-pyrazolidinedione (9.55 g., 1 mol), ethyl isoformanilide (18.0 g., 1 mol+100%), and N,N-dimethylacetamide (50 ml.) were mixed and heated under reflux for about seven minutes. The mixture was transferred to a beaker and diluted with methanol (250 ml.). After chilling the crude product was isolated by filtration, washed with methanol and dired. After one recrystallization from N,N-dimethylacetamide and methanol, the yield of dye was 5.05 g. (32%). After recrystallization of a portion of this dye (2.00 g.) from N,N-dimethylacetamide and methanol, the yield of pure dye was 1.85 g. (30% corrected yield), M.P. 268.0–269.0 degrees C. dec.

*Analysis.*—Calcd. for $C_{34}H_{28}N_4O_2$ (percent): C, 77.8; H, 5.4. Found (percent): C, 77.8; H, 5.5.

The dyes listed in Table 1 below were tested in a silver bromoiodide emulsion containing 0.77 mole percent iodide of the type described by Trivelli and Smith, Phot. Journal, 79, 330 (1939). The dyes, dissolved in suitable solvents, were added to separate portions of the emulsions at the concentrations indicated. The emulsions were then coated at a coverage of 432 mg. silver/ft.$^2$ on a cellulose acetate film support. A sample of each coating was exposed on an Eastman IB Sensitometer and to a wedge spectrograph, processed for three minutes in a developer of the following composition:

DEVELOPER

| | G. |
|---|---|
| N-methyl-p-aminosulfate | 2.0 |
| Sodium sulfite (anhydrous) | 90.0 |
| Hydroquinone | 8.0 |
| Sodium carbonate (monohydrate) | 52.5 |
| Potassium bromide | 5.0 |

Water to make 1.0 liter.

and then fixed, washed and dried. The sensitizing values obtained are shown in the following table.

TABLE 1

| Dye of Example Number: | Dye¹ | Emulsion type | Sensitizing range, mµ | maximum, mµ |
|---|---|---|---|---|
| 1 | | Silver bromoiodide | 790-840 | 825 |
| 2 | | do | 840-895 | 860 |

¹ Concentration (g./mole silver)

In the preparation of photographic emulsions, the new dyes of the invention are advantageously incorporated in the washed, finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which case the solvent selected should be completely free from any deleterious effect on the ultimate light-sensitive materials. Methanol, isopropanol, pyridine, etc., alone or in admixtures, have proven satisfactory as solvents for the majority of our new dyes. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinyl pyrrolidone, cellulose ethers, partially hydrolyzed cellulose acetate, and the like.

The concentration of the new dyes in the emulsion can vary widely, i.e., from about 5 to about 100 mgs. per liter of flowable emulsion. The specific concentration will vary according to the type of light-sensitive material in the emulsion and according to the effects desired. The suitable and most economical concentration for any given emulsion will be apparent to those skilled in the art upon making the tests and observations customarily used in the art of emulsion making.

To prepare a gelatino-silver halide emulsion sensitized with one of our new dyes, the following procedure is satisfactory: A quantity of the dye is dissolved in a suitable solvent and a volume of this solution containing from 5 to 100 mgs. of dye is slowly added to about 1000 cc. of a gelatino-silver halide emulsion. With most of our dyes, 10 to 20 mgs. of dye per liter of emulsion suffice to produce the maximum sensitizing effect with the ordinary gelatino-silver halides including silver chloride, bromide, bromoiodide, chlorobromide, chlorobromoiodide, etc. emulsions. With fine-grain emulsions, which include most of the ordinary employed gelatino-silver chloride emulsions and the like, somewhat larger concentrations of dye may be necesary to secure optimum sensitizing effect. While the preceding has dealt with emulsions comprising gelatin, it will be understood that these remarks apply generally to any emulsions wherein part or all of the gelatin is substituted by another suitable hydrophilic colloid such as mentioned above.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye in an appropriate solvent. Bathing methods, however, are not to be preferred ordinarily.

Although the photographic element examples herein show coatings made only on cellulose acetate support, it will be apparent that the photographic silver halide emulsions containing the sensitizing cyanine dyes of the invention can also be coated with advantage on other conventional photographic support materials such as glass, paper, cellulose acetate-propionate, cellulose nitrate, polystyrene, polyesters, and the like.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. patents to W. D. Baldsiefer 2,540,085, issued Feb. 6, 1951; R. E. Damschroder 2,597,856, issued May 27, 1952; and H. C. Yutzy et al., 2,597,915, issued May 27, 1952), various palladium compounds, such as palladium chloride (W. D. Baldsiefen, U.S. 2,540,086, issued Feb. 6, 1951), potassium chloropalladate (R. E. Stauffer et al., U.S. 2,598,079, issued may 27, 1952), etc., or mixture of such sensitizers; antifoggants, such as ammonium chloroplatinate (A. P. H. Trivelli et al., U.S. 2,566,245, issued Aug. 28, 1951), ammonium chloroplatinite (A. P. H. Trivelli et al., U.S. 2,566,263, issued Aug. 28, 1951), benzotriazole, nitrobenzimidazole, 5-nitroindazole, benzidine, mercaptans, etc. (see Mees, "The Theory of the Photographic Process," Macmillan Pub., 1942, page 460), or mixtures thereof; hardeners, such as formaldehyde (A. Miller, U.S. 1,763,533, issued June 10, 1930), chrome alum (U.S. 1,763,533), glyoxal (J. Brunken, U.S. 1,870,354, issued Aug. 9, 1932), dibromacrolein (O. Block et al., British 406,750, accepted Mar. 8, 1934), etc.; color couplers, such as those described in I. F. Salminen et al., U.S. Patent 2,423,730, issued July 7, 1947, Spence and Carroll, U.S. Patent 2,640,776, issued June 2, 1953, etc.; or mixtures of such addenda. Dispersing agents for color couplers, such as those set forth in U.S. patents to E. E. Jelley et al., 2,322,027, issued June 15, 1943, and L. D. Mannes et al., 2,304,940, issued Dec. 15, 1942, can also be employed in the above-described emulsions.

Although the invention has been described in detail with particular reference to preferred embodiments thereof, it will be understood that variations and modifications can be effected within the spirit and scope of the invention as described hereinabove and as defined in the appended claims.

We claim:

1. A photographic silver halide emulsion containing a polynuclear undissociated cyanine dye having the general formula:

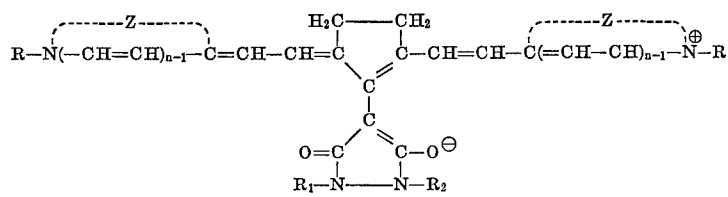

wherein each $n$ represents the same positive integer of from 1 to 2, each R represents the same member selected from the group consisting of an alkyl group, a substituted alkyl group, an allyl group, an aralkyl group and an aryl group, $R_1$ and $R_2$ each represents the same or different member selected from the group consisting of an alkyl group, an alkoxycarbonyl group and an aryl group, and each Z represents the same non-metallic atoms required to complete the same heterocyclic nucleus selected from the group consisting of a 3,3-dialkylindolenine nucleus and a 1,1-dialkyl-1H-benzindole nucleus.

2. A photographic silver halide emulsion in accordance with claim 1 containing a polynuclear undissociated cyanine dye having the general formula shown in claim 1 wherein Z represents the nonmetallic atoms required to complete a 1,1-dialkyl-1H-benzindole nucleus.

3. A photographic silver halide emulsion in accordance with claim 1 containing a polynuclear undissociated cyanine dye compound having the general formula shown in claim 1 wherein Z represents the nonmetallic atoms required to complete a 3,3-dialkylindolenine nucleus.

4. A photographic silver halide emulsion in accordance with claim 1 wherein the cyanine dye compound is 5-<{2,5-bis[3,3-dimethyl-1-(4-sulfobutyl) - 2 - indolinylidene]ethylidene}cyclopentylidene> - 1,2 - diphenyl - 3,5-pyrazolidinedione ditriethylammonium salt.

5. A photographic silver halide emulsion in accordance with claim 1 wherein the cyanine dye compound is 5-<{2,5-bis[1,1-dimethyl - 3 - (4-sulfobutyl)benzindolin-2 - ylidene]ethylidene}cyclopentylidene> - 1,2 - diphenyl-3,5-pyrazolidinedione ditriethylammonium salt.

6. A photographic element comprising a support having thereon a layer containing a photographic silver halide emulsion of claim 1.

7. A photographic element in accordance with claim 6 comprising a support having thereon a layer containing a photographic silver halide emulsion containing a polynuclear undissociated cyanine dye compound having the general formula shown in claim 1 wherein Z represents the nonmetallic atoms required to complete a 1,1-dialkyl-1H-benzindole nucleus.

8. A photographic element in accordance with claim 6 comprising a support having thereon a layer containing a photographic silver halide emulsion containing a polynuclear undissociated cyanine dye compound having the general formula shown in claim 1 wherein Z represents the nonmetallic atoms required to complete a 3,3-dialkylindolenine nucleus.

9. A photographic element in accordance with claim 6 comprising a support having thereon a layer containing a photographic silver halide emulsion which contains the cyanine dye 5-<{2,5-bis[3,3-dimethyl-1-(4-sulfobutyl)-2-indolinylidene]ethylidene}cyclopentylidene> - 1,2 - diphenyl-3,5-pyrazolidinedione ditriethylammonium salt.

10. A photographic element in accordance with claim 6 comprising a support having thereon a layer containing a photographic silver halide emulsion which contains the cyanine dye 5-<{2,5-bis[1,1-dimethyl-3-(4-sulfobutyl) benzindolin - 2 - ylidene]ethylidene}cyclopentylidene>-1,2-diphenyl - 3,5 - pyrazolidinedione ditriethylammonium salt.

References Cited
UNITED STATES PATENTS 2,955,939  10/1960  Brooker et al. _____ 96—105
3,379,533  4/1968   Jenkins et al. _____ 96—105

J. TRAVIS BROWN, Primary Examiner

U.S. Cl. X.R.

96—102, 106; 260—240.1